United States Patent [19]

Shaw

[11] Patent Number: 5,251,328
[45] Date of Patent: Oct. 5, 1993

[54] PREDISTORTION TECHNIQUE FOR COMMUNICATIONS SYSTEMS

[75] Inventor: David G. Shaw, Middletown, N.J.

[73] Assignee: AT&T Bell Laboratories, Murray Hill, N.J.

[21] Appl. No.: 630,636

[22] Filed: Dec. 20, 1990

[51] Int. Cl.$^5$ .......................... H04B 1/38; H04B 1/40
[52] U.S. Cl. ........................................ 455/73; 455/63; 455/69; 455/88; 375/12
[58] Field of Search .................... 455/88, 13.4, 15, 24, 455/63, 69, 116, 127, 73, 67.3, 67.4, 303, 305, 306; 375/12-13, 14, 76

[56] References Cited

U.S. PATENT DOCUMENTS

| | | | |
|---|---|---|---|
| 3,840,855 | 10/1974 | Ameau et al. | 340/146.1 A X |
| 4,441,192 | 4/1984 | Kita et al. | 375/14 |
| 4,539,583 | 9/1985 | Flamm et al. | 358/27 |
| 4,561,111 | 12/1985 | Conner | 455/63 |
| 4,802,236 | 1/1989 | Walczak et al. | 455/116 |
| 4,890,300 | 12/1989 | Andrews | 455/63 |
| 4,969,162 | 11/1990 | Karr | 375/12 |

FOREIGN PATENT DOCUMENTS 2225199 5/1990 United Kingdom.

Primary Examiner—Reinhard J. Eisenzopf
Assistant Examiner—Christine K. Belzer
Attorney, Agent, or Firm—David R. Padnes

[57] ABSTRACT

The problem of noise enhancement is eliminated in communications systems by predistorting the amplitude of the transmitted information signal in a manner which compensates for the amplitude distortion introduced in a portion of the communications channel. In the disclosed embodiments, the communications system includes two signal transceivers which communicate with one another through a communications channel. The communications channel includes two-wire subscriber loops adjacent to each signal transceiver with a four-wire transmission path disposed between the subscriber loops. Each transceiver transmits an information signal which, depending on the system noise characteristics, is predistorted to compensate for all or a portion of the amplitude distortion introduced in a subscriber loop adjacent to that signal transceiver. The predistortion necessary to provide such compensation is determined at each transceiver in response to received signals at that transceiver.

21 Claims, 2 Drawing Sheets

PREDISTORTION TECHNIQUE FOR COMMUNICATIONS SYSTEMS

TECHNICAL FIELD

The present invention relates to communications systems and, more particularly, to a technique for compensating for distortion introduced in a portion of a communications channel.

BACKGROUND OF THE INVENTION

Distortion compensation can be categorized as being either postdistortion or predistortion compensation or a combination of both. Postdistortion compensation is compensation that is provided after distortion is introduced into an information signal while predistortion compensation is compensation for distortion prior to the introduction of the distortion.

In many communications applications, the application of known distortion compensation techniques results in signal noise enhancement. This results from the fact that the information signal is subjected to more distortion than the noise. One example of this is in dial-up modem applications, where the communications channel includes two-wire subscriber loops, each having an associated amplitude versus frequency distortion characteristic, and a four-wire transmission system therebetween. Most of the signal noise is introduced in the four-wire transmission system. Accordingly, any information signal propagating through the communications channel is subjected to amplitude distortion within both subscriber loops while the noise is only subjected to amplitude distortion within one subscriber loop. The process of using linear equalizers to compensate for the distortion to which the information signal has been subjected results in over-equalization or enhancement of the noise signal.

The problem of noise enhancement is not severe for typical voice and low-speed data applications. However, as the data rate increases, such noise enhancement becomes intolerable as it substantially interferes with attainment of required bit error rates. Accordingly, compensation for such noise enhancement is required.

One prior art technique for addressing noise enhancement involves the use of decision feedback equalizers in each receiver to "whiten", i.e., provide a substantially flat amplitude-versus-frequency spectrum for the noise at the equalizer output. The problem with this technique is that a decision feedback equalizer is an inherently complex device to implement and is subject to error propagation. Another technique, known as the "Tomlinson" technique, is to adapt a decision feedback equalizer using a priori known data, thereby eliminating the problem of error propagation, and then transmitting the coefficients of this equalizer to a remote transmitter wherein such coefficients are used to predistort the transmitted signal. The shortcoming of this technique is that it requires the availability of an error-free communications channel for coefficient transmission. Such a channel is not always available when required.

Accordingly, it would be desirable if a distortion compensation technique could be devised which addresses the problem of noise enhancement which did not have the problems of error propagation and did not require an error-free communications channel for coefficient transmission.

SUMMARY OF THE INVENTION

The present invention addresses the above-described problem of noise enhancement and error propagation by predistorting the transmitted information signal without requiring an error-free communications channel to transmit coefficients from one transceiver to another. Broadly speaking, the present invention covers the notion of determining the distortion introduced within a portion of a communications channel between two signal transceivers by processing the received signal at a transceiver and then using the results of this processing to predistort the signal transmitted by that transceiver to compensate for all or a part of the determined amplitude distortion.

In the disclosed embodiment, which pertains to the above-described dial-up modem application, a training sequence of a priori known signals is transmitted from a first transceiver through the communications channel to a second transceiver. An adaptive filter in the receiver of the second transceiver receives this sequence and provides an error signal indicative of the amplitude distortion introduced in the subscriber loop adjacent to the second transceiver. This error signal is spectrally analyzed and the results of this analysis are used to adjust filters in the transmitter of the second transceiver. Such adjustment optimally sets the transmit conditions for communications from the second transceiver to the first by predistorting the transmitted information signal to compensate for all or a portion of the amplitude distortion introduced in the subscriber loop adjacent to the second transceiver. As will be described, the optimum predistortion varies with the system noise characteristics.

DETAILED DESCRIPTION

Figure 1:
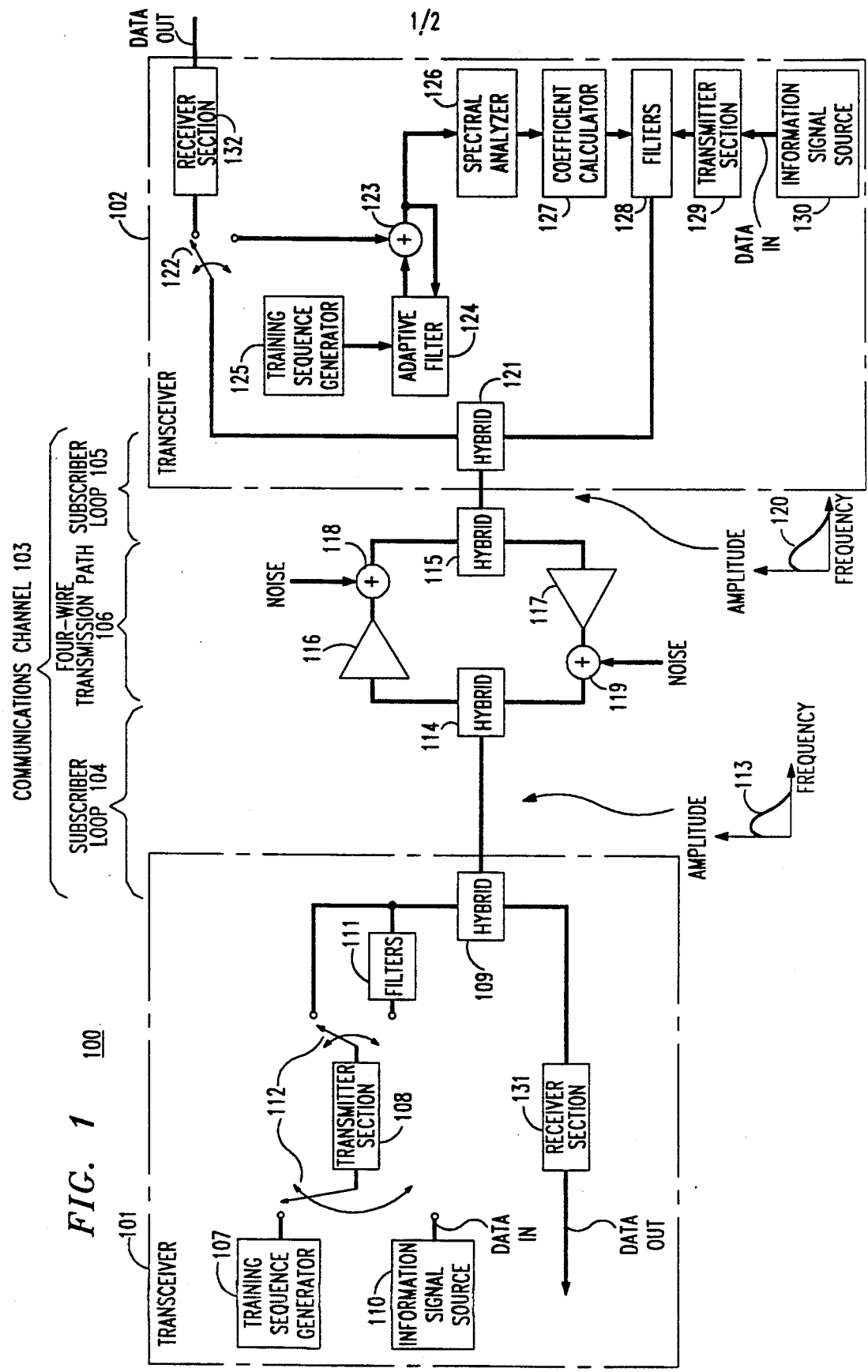
FIG. 1 is a block-schematic diagram of a communications system implementing a first embodiment of the present invention.

In the exemplary bidirectional communications system 100 shown in FIG. 1, which incorporates the present invention, transceivers 101 and 102, each incorporated within a dial-up modem (not shown), communicate with one another via communications channel 103. Communications channel 103 includes subscriber loops 104 and 105 which are each a two-wire communications path and are respectively connected to transceivers 101 and 102. Channel 103 also includes a four-wire signal transmission path 106 disposed between the aforesaid subscriber loops. Pursuant to the disclosed embodiment of the present invention, signals received at each transceiver of communications system 100 are processed to determine the amplitude distortion introduced within the adjacent subscriber loop. The determined amplitude distortion is then processed and used to predistort the signals transmitted from the distortion-determining transceiver. For purposes of simplicity, the present invention will be described in reference to determining the predistortion required for signals transmitted from transceiver 102 to transceiver 101 which, depending on the system noise characteristics, compensates for all or a portion of the distortion introduced within subscriber loop 105. Of course, an identical technique can be used to predistort the signals transmitted from transceiver 101 to transceiver 102 so as to equivalently compensate for the distortion introduced within subscriber loop 104.

To predistort the amplitude of the signal transmitted from transceiver 102 to transceiver 101, the amplitude distortion introduced in subscriber loop 105 must first be determined. To accomplish this, in accordance with the present invention, at each of one or more predetermined time intervals, e.g., during system start-up or "retraining", at least one training sequence is transmitted from transceiver 101 to transceiver 102. Each training sequence, including at least one a priori known signal, is coupled from training sequence generator 107 through the transmitter section 108 of transceiver 101 to hybrid 109 and thence to subscriber loop 104. At other times, an information signal from information signal source 110 is coupled to transmitter section 108 and thence spectrally shaped by filters 111 before being coupled to hybrid 109. Double-pole-double-throw switch 112 provides the selective coupling of either the training sequence or the information signal through the aforementioned apparatus. Hybrid 109 operates in well-known fashion to provide a two-to-four wire signal interface between transceiver 101 and subscriber loop 104. Advantageously, the training sequence provided by training sequence generator 107 has a substantially flat amplitude spectrum over a frequency range greater than that of the information signal after spectral shaping by filters 111. While a variety of training sequences, such as a "chirp" or swept-frequency signal, can provide such a spectrum, a preferable training sequence is a pseudorandom sequence.

Subscriber loop 104 has an associated amplitude-versus-frequency distortion characteristic which selectively attenuates the amplitude of any signal coupled therethrough. This characteristic, designated by reference numerals 113 in FIG. 1, predominantly attenuates the coupled signal at higher frequencies and also attenuates, to a lesser extent, frequencies close to dc due to the characteristics of hybrids 109 and 114. The attenuation characteristic is substantially the same for both directions of transmission over subscriber loop 104.

Four-wire signal transmission path 106 includes a pair of hybrids 114 and 115 and amplifiers 116 and 117. Path 106 can also be symbolically represented as including summing nodes 118 and 119 to reflect the fact that while the amplitude-versus-frequency characteristic of path 106 is substantially flat, most of the noise in communications channel 103 is injected by path 106 into the signal coupled in either transmission direction. This noise can be from a variety of sources, such as quantization noise in digital four-wire systems or thermal noise in analog four-wire systems. Each of hybrids 114 and 115 in path 106 serves as a two-to-four-wire interface for its adjacent subscriber loop and each amplifier provides unidirectional transmission in analog transmission systems and is representative of codecs in digital transmission systems.

After propagating through four-wire transmission path 106, the transmitted signal from transceiver 101 enters subscriber loop 105 and is again subjected to an amplitude-versus-frequency distortion characteristic, designated as 120, which selectively attenuates the amplitude of any coupled signal. Hybrids 115 and 121 have a similiar effect on characteristic 120 as their counterparts, i.e., hybrids 109 and 114, have on characteristic 113. Characteristic 120 can be the same or different from characteristic 113 but is typically different due to the fact that each subscriber loop need not have the same length and that even if the lengths are the same, each subscriber loop can be fabricated using signal conductors having a different loss-per-unit length. However, as noted above with respect to characteristic 113, characteristic 120 is substantially the same for signal transmission in either direction over subscriber loop 105.

Within transceiver 102, the noise and amplitude-distorted signals coupled from subscriber loop 105 pass through hybrid 121. During each predetermined time interval when a training sequence is transmitted from transceiver 101, switch 122 couples the received training sequence to summing node 123. At other times, i.e., at times when the training sequence is not transmitted, switch 122 couples the received information signal originally provided by information signal source 110 to receiver section 132 in transceiver 102. Receiver section 132, which is of conventional design and can incorporate echo-canceling apparatus, recovers the information signal provided by source 110.

The received training sequence includes the noise and amplitude distortion introduced by communications channel 103. Node 123 combines the received training sequence with the output of adaptive filter 124. Filter 124 produces its output in response to a training sequence provided by training sequence generator 125. This training sequence is identical to that provided by training sequence generator 107. The output of node 123 is the "error" signal of the adaptive filter and is coupled back to filter 124 wherein it is used to adjust, in well-known fashion, the tap-weight coefficients therein. Pursuant to the present invention, it is recognized that once filter 124 converges, the output of node 123 or residual error signal represents the noise signal injected in path 106 and coupled through subscriber loop 105. This noise signal has only experienced the amplitude distortion introduced by subscriber loop 105 and can be analyzed to determine distortion characteristic 120, i.e., the amplitude-versus-frequency response of subscriber loop 105. This characteristic can then be analyzed and used to predistort the signal transmitted from transceiver 102 to transceiver 101 in a manner which minimizes the noise enhancement associated with information signals received at transceiver 101. Advantageously, this technique unlike the prior art does not require the transmission of coefficients or equivalent information from transceiver 101 to transceiver 102.

The determination of the predistortion for the transmitted signal from transceiver 102, which compensates for all or a portion of the amplitude distortion introduced in subscriber loop 105, is provided by spectral analyzer 126 and coefficient calculator 127 in response to the output of node 123. Analyzer 126, using well-known techniques, analyzes the output signal at node 123 and determines the characteristic 120 therefrom. By processing this determined characteristic, coefficient calculator 127 generates the coefficients required by transmit filters 128 using well-known procedures for filter design, such as inverse Fourier transforms or the Remez exchange algorithm, to predistort the amplitude of the signal outputted by transmitter section 129. Information signal source 130 provides the information signal to be transmitted by transmitter section 129. This transmitted signal is coupled through communications channel 103, and thence to receiver section 131 in transceiver 101. Receiver section 131 recovers the information signal provided by information signal source 130.

In certain system applications, it is desirable to predistort the transmitted signal from transceiver 102 based on the exact inverse of the determined distortion characteristic 120. Such processing works well when the noise injected by four-wire transmission path 106 is primarily quantization noise. Such quantization noise is introduced in analog-to-digital signal conversion and vice-versa and is therefore inherent in digital transmission systems. In other applications, where the noise is primarily thermal or white noise, the optimal predistortion is less than that provided by an exact inversion of the determined distortion characteristic 120. Indeed, it has been found that for purely white noise the optimal predistortion is that obtained by using fifty percent of the inverse of the amplitude versus frequency differential of characteristic 120. This optimal white noise predistortion can be readily provided by adjusting the output provided by spectral analyzer 126.

Figure 2:
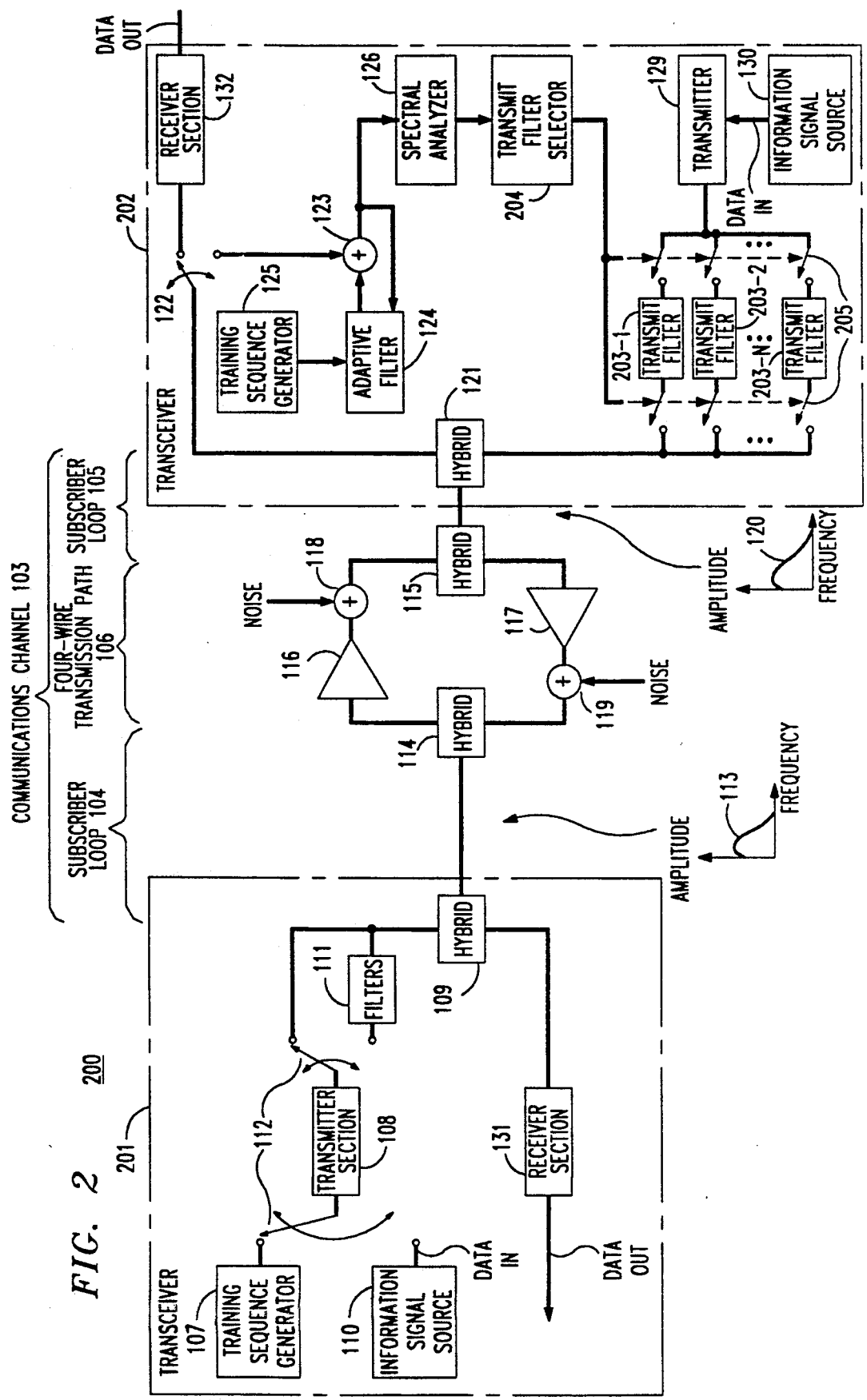
FIG. 2 is a block-schematic diagram of a communications system implementing a second embodiment of the present invention.

FIG. 2 shows an alternate embodiment of the present invention which functions in a substantially identical manner to FIG. 1 except that any transceiver which predistorts its transmitted signal is designed with a plurality of transmit filters. FIG. 2 shows transceiver 202 with a plurality of transmit filters 203-1 through 203-N, where N is a predetermined integer. Each of the transmit filters has a different predetermined filter characteristic. With this filter arrangement, instead of determining the filter coefficients for a transmit filter, the output of spectral analyzer 126 is processed by transmit filter selector 204 to determine which of transmit filters 203-1 through 203-N provides the optimal amplitude predistortion for signals transmitted from transceiver 102. Again, depending on system noise characteristics, this optimal predistortion can be that which compensates for all or a percentage portion of the amplitude distortion introduced within subscriber loop 105. Once this filter determination is made, the determined filter is serially connected to the output of transmitter portion 127 via multi-pole switch 205. Switch 205 operates in response to control signals provided by transmit filter selector 204.

It should, of course, be understood that, while the present invention has been disclosed in reference to a specifically described embodiment, numerous alternative arrangements will be apparent to those of ordinary skill in the art. For example, while the disclosed embodiments utilize discrete devices, the devices can be implemented using one or more appropriately programmed general-purpose processors or special-purpose integrated circuits or digital processors or an analog or hybrid counterpart of any of these devices. Or, while the present invention has been described with reference to a specific communications application, it is also applicable to other applications wherein the amplitude versus distortion characteristic of a portion of the communications channel is substantially similar for each direction of signal transmission.

I claim:

1. Transceiver apparatus for use in a communications system wherein a communications channel through which a signal is transmitted introduces amplitude distortion, said apparatus comprising means responsive to a received signal from said communications channel for determining substantially less than all of the amplitude distortion introduced within said communications channel, said determining means being designed for determining substantially less than all of the amplitude distortion introduced within said communications channel; and means responsive to said determined amplitude distortion for predistorting a transmitted signal from said transceiver.

2. A method for use in a transceiver of a communications system wherein a communications channel through which a signal is transmitted introduces amplitude distortion, said method comprising the steps of determining less than all of the amplitude distortion introduced within said communications channel in response to a signal received from said communications channel using apparatus designed to determine less than all of the amplitude distortion introduced within said communications channel; and predistorting a transmitted signal from said transceiver in response to said determined amplitude distortion.

3. Apparatus for use in a communications system wherein a signal is transmitted through a communications channel including a plurality of serially connected channel sections which introduce amplitude distortion into a transmitted signal including the section adjacent said apparatus, said apparatus comprising means for receiving a training sequence including at least one a priori known signal and means responsive to said received training sequence for determining the amplitude distortion introduced only in the communications channel section adjacent said apparatus.

4. The apparatus of claim 3 further including means responsive to said determined amplitude distortion for predistorting a transmitted signal from said apparatus and wherein said predistorting means predistorts said transmitted signal to compensate for all of said determined amplitude distortion.

5. The apparatus of claim 3 further including means responsive to said determined amplitude distortion for predistorting a transmitted signal from said apparatus and wherein said predistorting means predistorts said transmitted signal to compensate for less than all of said determined amplitude distortion.

6. The apparatus of claim 3 wherein said communications channel includes two subscriber loops and the communications channel section adjacent said apparatus is a subscriber loop.

7. The apparatus of claim 3 wherein said determining means includes an adaptive filter.

8. The apparatus of claim 3 further including means responsive to said determined amplitude distortion for predistorting a transmitted signal from said apparatus and wherein said predistorting means includes a transmit filter.

9. The apparatus of claim 8 wherein said transmit filter has at least one filter coefficient and said determining means determines said filter coefficient.

10. The apparatus of claim 3 further including means responsive to said determined amplitude distortion for predistorting a transmitted signal from said apparatus and wherein said predistorting means includes a plurality of transmit filters.

11. The apparatus of claim 10 wherein said determining means includes means for selecting one of said transmit filters to predistort the amplitude of said transmitted signal.

12. The apparatus of claim 3 wherein said determining means is responsive to said training sequence at at least one predetermined time.

13. The apparatus of claim 3 wherein said training sequence is a pseudorandom sequence.

14. The apparatus of claim 3 further including means for generating a second training sequence identical to that transmitted through said communications channel and said determining means includes an adaptive filter which is responsive to said second training sequence.

15. A method for use in a communications system wherein a signal is transmitted from a transmitter through a communications channel to a receiver, said communications channel including a plurality of serially connected channel sections which introduce amplitude distortion into a transmitted signal including the section adjacent said receiver, said method comprising the steps of
receiving a training sequence including at least one a priori known signal and
determining the amplitude distortion introduced only in the communications channel section adjacent said receiver in response to said received training sequence.

16. A communications system including first and second signal transceivers interconnected by a communications channel which introduces amplitude distortion in a transmitted signal, said first signal transceiver comprising
means for transmitting a signal through said communications channel, and
said second transceiver comprising
means, responsive to the signal received from said communications channel, for determining substantially less than all of the amplitude distortion introduced within said communications channel, said determining means being designed for determining substantially less than all of the amplitude distortion introduced within said communications channel, and
means for predistorting a transmitted signal in response to said determined amplitude distortion.

17. Transceiver apparatus for use in a communications system in which signals are transmitted from said transceiver apparatus over a communications channel to second transceiver apparatus utilizing adaptive filtering in its receiver section, said channel being of a type which introduces amplitude distortion and noise into said transmitted signals, said channel having a plurality of portions over which said noise does not propagate but which introduce said amplitude distortion, said apparatus comprising
means responsive to a signal received from said communications channel for determining the amplitude distortion introduced into said transmitted signals within one of said portions of said communications channel, and
means responsive to said determined amplitude distortion for predistoring said transmitted signals in such a way as to compensate for at least a portion of the distortion introduced within said one portion,
whereby enhancement of said noise as the result of adaptive filtering of the signals received by said second transceiver apparatus is reduced.

18. The transceiver apparatus of claim 17 wherein said one portion is directly adjacent to said transceiver apparatus.

19. The transceiver apparatus of claim 17 wherein said signal received from the communications channel represents a predetermined training sequence and wherein said determining means includes
means responsive to that received signal and to a signal generated in said transceiver apparatus that represents said training sequence for generating an error signal which substantially represents only a noise component of that received signal, and
means for analyzing said error signal to carry out the amplitude distortion determination.

20. Transceiver apparatus for use in a communications system wherein a communications channel through which a signal is transmitted introduces amplitude distortion in each of a plurality of serially connected communications channel sections, said apparatus comprising
means for determining the amplitude distortion introduced within only one of said communications channel sections in response to a received signal from said communications channel; and
means responsive to said determined amplitude distortion for predistorting a transmitted signal from said transceiver.

21. A method for use in a transceiver of a communications system wherein a communications channel through which a signal is transmitted introduces amplitude distortion in each of a plurality of serially connected communications channel sections, said method comprising the steps of
determining the amplitude distortion introduced within only one of said communications channel sections in response to a signal received from said communications channel; and
predistorting a transmitted signal from said transceiver in response to said determined amplitude distortion.

* * * * *